US005812789A

United States Patent [19]
Diaz et al.

[11] Patent Number: 5,812,789
[45] Date of Patent: Sep. 22, 1998

[54] VIDEO AND/OR AUDIO DECOMPRESSION AND/OR COMPRESSION DEVICE THAT SHARES A MEMORY INTERFACE

[75] Inventors: Raul Zegers Diaz, Palo Alto; Jefferson Eugene Owen, Freemont, both of Calif.

[73] Assignee: STMicroelectronics, Inc., Carrollton, Tex.

[21] Appl. No.: 702,911

[22] Filed: Aug. 26, 1996

[51] Int. Cl.$^6$ ..................................................... G06F 17/00
[52] U.S. Cl. ........................................................ 395/200.77
[58] Field of Search ........................ 395/200.77, 200.82, 395/507, 890, 729; 348/402, 407, 10

[56] References Cited

U.S. PATENT DOCUMENTS

| | | | |
|---|---|---|---|
| 4,774,660 | 9/1988 | Conforti | 395/729 |
| 4,894,565 | 1/1990 | Marquardt | 395/729 |
| 5,027,400 | 6/1991 | Baji et al. | 348/10 |
| 5,371,893 | 12/1994 | Price et al. | 395/729 |
| 5,459,519 | 10/1995 | Scalise et al. | 348/431 |
| 5,522,080 | 5/1996 | Harney et al. | 395/729 |
| 5,557,538 | 9/1996 | Retter et al. | 348/402 |
| 5,598,525 | 1/1997 | Nally et al. | 395/507 |
| 5,621,893 | 4/1997 | Joh | 395/200.82 |
| 5,623,672 | 4/1997 | Poppat | 395/729 |

FOREIGN PATENT DOCUMENTS 0 673 171 A2  9/1995  European Pat. Off. .

OTHER PUBLICATIONS

Bheda, H. and P. Srinivasan, "A High–Performance Cross–Platform MPEG Decoder," *Digital Video Compression on Personal Computers: Algorithms and Technologies*. SPIE Proceedings, Feb. 7–8, 1994, Vo. 2187, pp. 241–248.

Bursky, D., "Highly Integrated Controller Eases MPEG–2 Adoption," *Electronic Design*, Aug. 21, 1995, vol. 43, No. 17, pp. 141–142.

Galbi, D. et al., "An MPEG–1 Audio/Video Decoder With Run–Length Compressed Antialiased Video Overlays," 1995 IEEE International Solid–State Circuits Conference, pp. 286–287, 381.

Maturi, G., "Single Chip MPEG Audio Decoder," IEEE Transactions on Consumer Electronics, vol. 38, No. 3, Aug. 1992, pp. 348–356.

Butler, B. and T. Mace, "The Great Leap Forward," *PC Magazine*, Oct. 11, 1994, pp. 241–244, 246, 248, 250, 253–254, 256, 260–261, 264, 266–268, 273–275, 278.

Doquilo, J., "Symmetric Multiprocessing Servers: Scaling the Performance Wall," *Infoworld*, Mar. 27, 1995, pp. 82–85, 88–92.

Video Electronics Standards Association, "VESA Unified Memory Architechture Hardware Specifications Proposal," Version: 1.0p, Oct. 31, 1995, pp. 1–38.

Video Electronics Standards Association, "VESA Unified Memory Architecture VESA BIOS Extensions VUMA–SBE Proposal," Version: 1.0p, Nov. 1, 1995, pp. 1–26.

King, A., *Inside Windows 95*, Microsoft Press, Redmond, Washington, 1994, pp. 85–90.

"MPEG Video Overview," *SGS–Thomson Microelectronics Technical Note*, Apr. 1992, pp. 1–4.

"On the Bus Arbitration for MPEG 2 Video Decoder"; VLSI Tech, System and Application, 1995 Symposium.

"A Low Cost Graphics and Multimedia Workstation Chip Set"; IEEE Micro, 1994.

*Primary Examiner*—Ellis B. Ramirez
*Attorney, Agent, or Firm*—David V. Carlson; Theodore E. Galanthay; Lisa K. Jorgenson

[57] ABSTRACT

An electronic system that contains a first device that requires a memory interface and video and/or audio decompression and/or compression device that shares a memory interface and memory with the first device while still permitting the video and/or audio decompression and/or compression device to operate in real time is disclosed.

33 Claims, 5 Drawing Sheets

VIDEO AND/OR AUDIO DECOMPRESSION AND/OR COMPRESSION DEVICE THAT SHARES A MEMORY INTERFACE

CROSS-REFERENCE TO RELATED APPLICATIONS

This application contains some text and drawings in common with pending U.S. patent applications entitled: "Video and/or Audio Decompression and/or Compression Device that Shares a Memory" by Jefferson E. Owen, Raul Z. Diaz, and Osvaldo Colavin Ser. No. 08/702,910 filed on Aug. 26, 1996, and has the same effective filing date and ownership as the present application, and to that extent is related to the present application, which is incorporated herein by reference.

BACKGROUND

The present invention relates to the field of electronic systems having a video and/or audio decompression and/or compression device, and is more specifically directed to sharing a memory interface between a video and/or audio decompression and/or compression device and another device contained in the electronic system.

The size of a digital representation of uncompressed video images is dependent on the resolution, and color depth of the image. A movie composed of a sequence of such images, and the audio signals that go along with them, quickly becomes large enough so that uncompressed such a movie typically cannot fit entirely onto conventional recording medium, such as a CD. It is also typically now prohibitively expensive to transmit such a movie uncompressed.

It is therefore advantageous to compress video and audio sequences before they are transmitted or stored. A great deal of effort is being expanded to develop systems to compress these sequences. There are several coding standards currently used that are based on the discrete cosine transfer algorithm including MPEG-1, MPEG-2, H.261, and H.263. (MPEG stands for "Motion Picture Expert Group", a committee of the International Organization for Standardization, ISO.) The MPEG-1, MPEG-2, H.261, and H.263 standards are decompression protocols that describe how an encoded bitstream is to be decoded. The encoding can be done in any manner, as long as the resulting bitstream complies with the standard.

Video and/or audio compression devices (hereinafter encoders) are used to encode the video and/or audio sequence before it is transmitted or stored. The resulting bitstream is decoded by a video and/or audio decompression device (hereinafter decoder) before the video and/or audio sequence is displayed. However, a bitstream can only be decoded by a decoder if it complies to the standard used by the decoder. To be able to decode the bitstream on a large number of systems it is advantageous to encode the video and/or audio sequences to comply to a well accepted decompression standard. The MPEG standards are currently well accepted standards for one way communication. H.261, and H.263 are currently well accepted standards for video telephony.

Once decoded the images can be displayed on an electronic system dedicated to displaying video and audio, such as television or digital video disk (DVD) player, or on electronic systems where image display is just one feature of the system, such as a computer. A decoder needs to be added to these systems to allow them to display compressed sequences, such as received images and associated audio, or ones taken from a storage device. An encoder needs to be added to allow the system to compress video and/or audio sequences, to be transmitted or stored. Both need to be added for two way communication such as video telephony.

A typical decoder, such as an MPEG decoder 10 shown in FIG. 1a, contains video decoding circuitry 12, audio decoding circuitry 14, a microcontroller 16, and a memory interface 18. The decoder can also contain other circuitry depending on the electronic system the decoder is designed to operate in. For example, when the decoder is designed to operate in a typical television the decoder will also contain an on screen display (OSD) circuit.

FIG. 1b shows a better decoder architecture, used in the STi3520 and STi3520A MPEG Audio/MPEG-2 Video Integrated Decoder manufactured by SGS-THOMSON Microelectronics. The decoder has a register interface 20 instead of a microcontroller. The register interface 20 is coupled to an external microcontroller 24. The use of a register interface 20 makes it possible to tailor the decoder 10 to the specific hardware the decoder 10 interfaces with or change its operation without having to replace the decoder by just reprogramming the register interface. It also allows the user to replace the microcontroller 24, to upgrade or tailor the microcontroller 24 to a specific use, by just replacing the microcontroller and reprogramming the register interface 20, without having to replace the decoder 10.

The memory interface 18 is coupled to a memory 22. A typical MPEG decoder 10 requires 16 Mbits of memory to operate in the main profile at main level mode (MP at ML). This typically means that the decoder requires a 2 Mbyte memory. Memory 22 is dedicated to the MPEG decoder 10 and increases the price of adding a decoder 10 to the electronic system. In current technology the cost of this additional dedicated memory 22 can be a significant percentage of the cost of the decoder.

An encoder also requires a memory interface 18 and dedicated memory. Adding the encoder to an electronic system again increases the price of the system by both the price of the encoder and its dedicated memory.

A goal in the semiconductor industry is to reduce the die area of an integrated circuit device for a given functionality. Some advantages of reducing the die area is the increase in the number of the die that can be manufactured on same size silicon wafer, and the reduction in price per die resulting therefrom. This results in both an increase in volume and reduction in price of the device.

Many of the functional circuits described above for FIG. 1a and FIG. 1b take up a lot of die space. However, each of them is needed to make the respective decoder operate.

FIG. 1c shows a computer 25 containing a decoder 10, a main memory 168 and other typical components such as a modem 199, and graphics accelerator 188. The decoder 10 and the rest of the components are coupled to the core logic chipset 190 through a bus 170. The bus is typically a PCI (peripheral component interface) or ISA (industry standard architecture) bus, and each component contains an appropriate interface for interfacing with the bus.

When any component needs access to the memory 168 either to read from or write to the main memory 168, it generates a request which is placed on the bus 26. When the request is a write the data to be written is also placed on the bus 26. The request is processed in the core logic chipset 190 and the data is then either written to or read from the main memory 168. When data is read from the main memory 168 the data is now placed on the bus and goes to the component that requested the read.

There are typically many components in the computer systems that may require access to the main memory 168, and they are typically all coupled to the same bus 174, or possibly several buses 170, 198 connected together by a PCI bridge 192, if there are not enough connectors on one bus to accommodate all of the peripherals. However, the addition of each bus is very expensive. Each request is typically processed according to a priority scheme. The priority scheme is typically based on the priority given to the device and the order in which the requests are received. Typically, the priority scheme is set up so no device monopolizes the bus, starving all of the other devices. Good practice suggests that no device on the bus require more than approximately 50% of the bus's bandwidth.

The minimum bandwidth required for the decoder 10 can be calculated based on the characteristics and desired operation of the decoder. These characteristics include the standard to which the bitstream is encoded to comply with, whether the decoder is to operate in real time, to what extent frames are dropped, and how the images are stored. Additionally, the latency of the bus that couples the decoder to the memory should be considered.

If the decoder does not operate in real time the decoded movie would stop periodically between images until the decoder can get access to the memory to process the next image. The movie may stop quite often between images and wait.

To reduce the minimum required bandwidth and still operate in real time, the decoder 10 may need to drop frames. If the decoder 10 regularly does not decode every frame then it may not need to stop between images. However, this produces very poor continuity in the images. This is problematic with an image encoded to the MPEG-1 or MPEG-2 standard, or any standards that uses temporal compression. In temporal (interpicture) compression some of the images are decoded based on previous images and some based on previous and future images. Dropping an image on which the decoding of other images is based is unacceptable and will result in many poor or even completely unrecognizable images.

The computer can also contain both a decoder and encoder to allow for video telephony, as described above. In this case not operating in real time would mean that the length of time between the occurrence of an event, such as speaking, at one end of the conversation until the event is displayed at the other end of the conversation is increased by the time both the encoder and then the decoder must wait to get access to the bus and the main memory. Not being able to operate in real time means that there would be gaps in the conversation until the equipment can catch up. This increases the time needed to have a video conference, and makes the conference uncomfortable for the participants.

One widely used solution to allow a component in a computer system to operate in real time is to give the component its own dedicated memory. Thus, as shown in FIG. 1c, the decoder 10 can be given its own dedicated memory 22, with a dedicated bus 26 to connect the decoder 10 to its memory 22. The dedicated memory 22, its controller and the pins to control this memory significantly increase the cost of adding a decoder 10 to the computer.

SUMMARY OF THE INVENTION

The present application discloses an electronic system that contains a first device and video and/or audio decompression and/or compression device capable of operating in real time. Both the first device and the video and/or audio decompression and/or compression device require a memory interface. The video and/or audio decompression and/or compression device shares a memory interface and the memory with the first device. In the preferred embodiment of the invention the shared memory interface contains an arbiter. The arbiter and DMA engines of the video and/or audio decompression and/or compression device and of the first device are configured to arbitrate between the two devices when one of them is requesting access to the memory. This allows the use of one memory interface to control the access of both the video and/or audio decompression and/or compression device and the first device to the memory.

When the video and/or audio decompression and/or compression device used in an electronic system, such as a computer, already containing a device that has a memory interface the video and/or audio decompression and/or compression device can share that memory interface and the memory of the device and the memory interface and memory of the video and/or audio decompression and/or compression device can be eliminated. Eliminating this memory interface reduces the die area without changing the critical dimensions of the device. Therefore increasing the volume and reducing the cost of the decoder or encoder. Eliminating the memory greatly reduces the cost of adding the video and/or audio decompression and/or compression device to the electronic system while not requiring the video and/or audio decompression and/or compression device to be connected to the system bus, allowing the video and/or audio decompression and/or compression device to operate in real time.

An advantage of the present invention is significant cost reduction due to the fact that the video and/or audio decompression and/or compression device does not need its own dedicated memory but can share a memory with another device and still operate in real time.

Another significant advantage of the present invention is that the die space needed for the video and/or audio decompression and/or compression device is smaller because the memory interface on the video and/or audio decompression and/or compression device is eliminated.

A further advantage of the present invention is that the video and/or audio decompression and/or compression device can share the memory of the device with which it is sharing the memory interface more efficiently.

Another advantage of the present invention is that the cost of producing a video and/or audio decompression and/or compression device is reduced because the memory interface on the video and/or audio decompression and/or compression device is eliminated.

Another advantage of the present invention is that the video and/or audio decompression and/or compression device can be monolithically integrated into the first device and no extra packaging or pins are needed for the video and/or audio decompression and/or compression device, and no pins are needed for the first device to connect to the video and/or audio decompression and/or compression device, saving pins on both devices and producing a better connection between the two devices.

Other advantages and objects of the invention will be apparent to those of ordinary skill in the art having reference to the following specification together with the drawings.

DETAILED DESCRIPTION OF THE PREFERRED EMBODIMENT

Figure 1A:
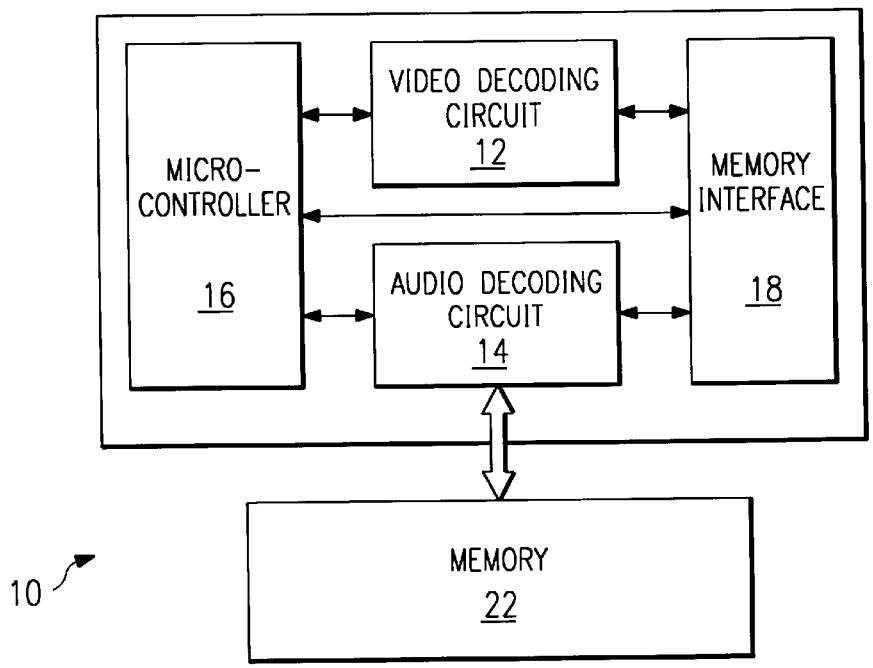
FIGS. 1a and 1b are electrical diagrams, in block form, of prior art decoders.
Figure 1B:
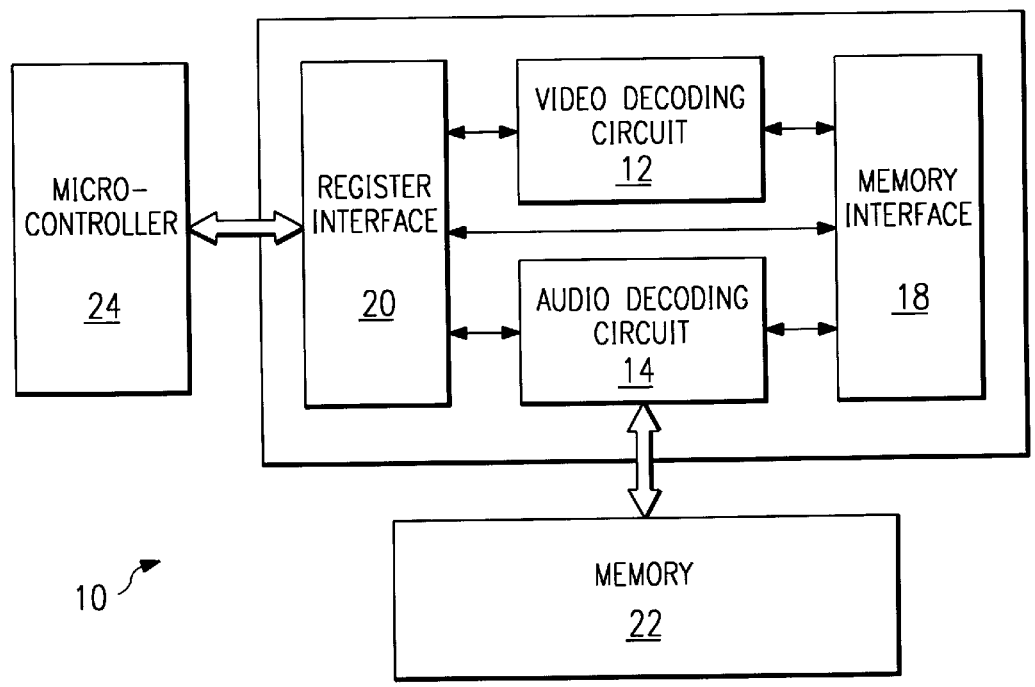
Figure 1C:
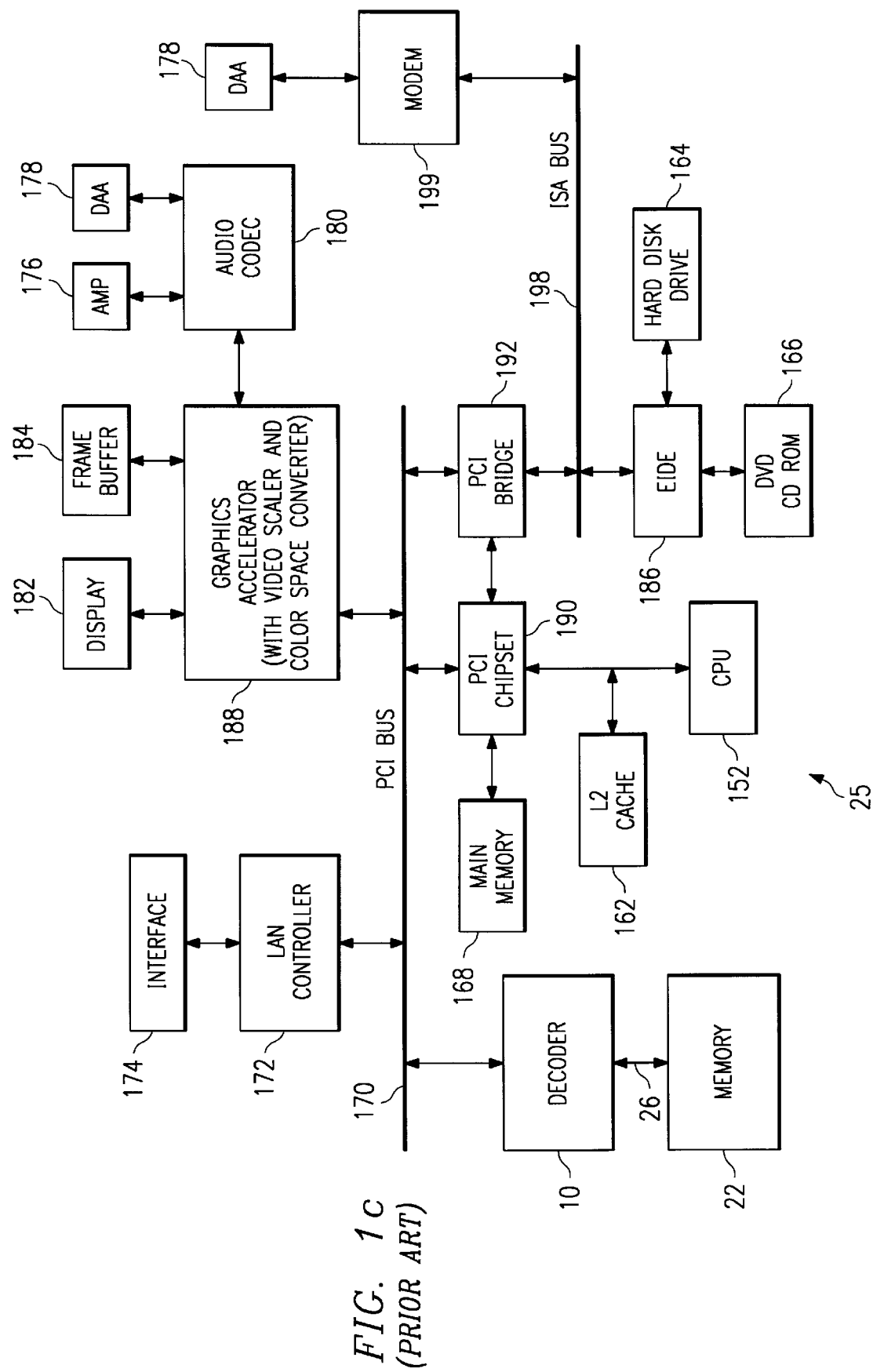
FIG. 1c is an electrical diagram, in block form, of a computer system containing a decoder according to the prior art.
Figure 2:
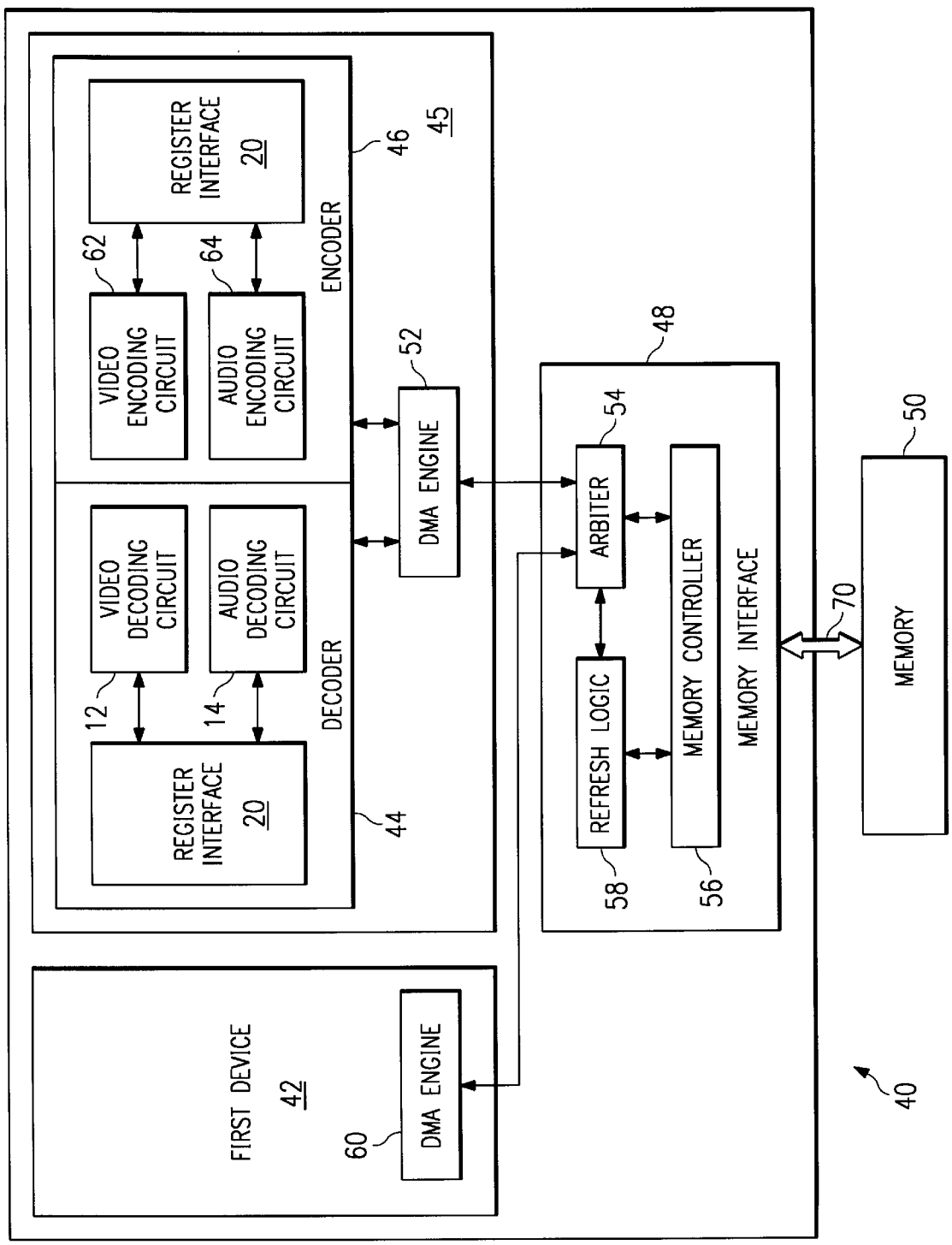
FIG. 2 is an electrical diagram, in block form, of an electronic system containing a device having a memory interface and an encoder and decoder.

FIG. 2 shows an electronic system 40 containing a first device 42 having access to a memory 50 through a memory interface 48, and a decoder 44 and encoder 46, having access to the same memory 50 through the same memory interface 48. First device 42 can be a processor, a core logic chipset, a graphics accelerator, or any other device that requires access to the memory 50, and either contains or is coupled to a memory interface. Any parts common to FIGS. 1 through 4 are indicated using the same numbering system. In the preferred embodiment of the invention, electronic system 40 contains a first device 42, a decoder 44, an encoder 46, a memory interface 48, and a memory 50. Although, either the decoder 44 or encoder 46 can be used in the decoder/encoder 45 without the other. For ease of reference, a video and/or audio decompression and/or compression device 45 will hereinafter be referred to as decoder/encoder 45. The decoder/encoder 45 may be a single device, or cell on an integrated circuit, or may be two separate devices, or cells in an integrated circuit. In the preferred embodiment of the invention, the first device 42, decoder/encoder 45, and memory interface 48 are on one integrated circuit, however, they can be on separate integrated circuits in any combination.

The decoder 44 includes a video decoding circuit 12 and an audio decoding circuit 14, both coupled to a register interface 20. The decoder 44 can be either a video and audio decoder, just a video, or just an audio decoder. If the decoder 44 is just a video decoder it does not contain the audio decoding circuitry 14. The audio decoding can be performed by a separate audio codec coupled to the first device 42, or through software. In the preferred embodiment of the invention, when the decoder/encoder 45 is in a system containing a processor and is coupled to the processor, the audio decoding is performed in software. This frees up space on the die without causing significant delay in the decoding. If the audio decoding is performed in software, the processor should preferably operate at a speed to allow the audio decoding to be performed in real time without starving other components of the system that may need to utilize the processor. For example, currently software to perform AC-3 audio decoding takes up approximately 40% of the bandwidth of a 133 MHz Pentium. The encoder 46 includes a video encoding circuit 62 and an audio encoding circuit 64, both coupled to a register interface 20. The encoder 46 can be either a video and audio encoder, just a video, or just an audio encoder. If the encoder 46 is just a video encoder, it does not contain the audio encoding circuitry 64. The audio encoding can be performed by a separate audio codec coupled to the first device 42, or through software. In the preferred embodiment of the invention, when the decoder/encoder 45 is in a system containing a processor and is coupled to the processor, the audio encoding is performed in software presenting the same advantages of freeing up space on the die without causing significant delay in the encoding. The register interfaces 20 of the decoder 44 and encoder 46 are coupled to a processor.

The decoder 44 and encoder 46 are coupled to the direct memory access (DMA) engine 52. The decoder and encoder can be coupled to the same DMA engine as shown in FIG. 2, or each can have its own DMA engine, or share a DMA engine with another device. When the decoder/encoder 45 are two separate devices or cells, decoder 44 and encoder 46 can still be coupled to one DMA engine 52. When the decoder/encoder is one device or is one cell on an integrated circuit, the DMA engine 52 can be part of the decoder/encoder 45, as shown in FIG. 2. The DMA engine 52 is coupled to the arbiter 54 of the memory interface 48.

The first device 42 also contains a DMA engine 60. The DMA engine 60 of the first device 42 is coupled to the arbiter 54 of the memory interface 48. The arbiter is also coupled to the refresh logic 58 and the memory controller 56. The memory interface 48 is coupled to a memory 50. The memory controller 56 is the control logic that generates the address the memory interface 48 accesses in the memory 50 and the timing of the burst cycles.

In current technology, memory 50 is typically a DRAM. However, other types of memory can be used. The refresh logic 58 is needed to refresh the DRAM. However, as is known in the art, if a different memory is used, the refresh logic 58 may not be needed and can be eliminated.

The decoder/encoder 45 is coupled to the memory 50 through devices, typically a bus 70, that have a bandwidth greater than the bandwidth required for the decoder/encoder 45 to operate in real time. The minimum bandwidth required for the decoder/encoder 45 can be calculated based on the characteristics and desired operation of the decoder, including the standard to which the bitstream is encoded to comply with, whether the decoder/encoder 45 is to operate in real time, to what extent frames are dropped, and which images are stored. Additionally, the latency of the bus 70 that couples the decoder/encoder 45 to the memory 50 should be considered.

A goal is to have the decoder/encoder 45 operate in real time without dropping so many frames that it becomes noticeable to the human viewer of the movie. To operate in real time the decoder/encoder 45 should decoder and/or encode images fast enough so that any delay in decoding and/or encoding cannot be detected by a human viewer. This means that the decoder/encoder 45 has a required bandwidth that allows the decoder/encoder 45 to operate fast enough to decode the entire image in the time between screen refreshes, which is typically 1/30 of a second, with the human viewer not being able to detect any delay in the decoding and/or encoding. To operate in real time the required bandwidth should be lower than the bandwidth of the bus. In order not to starve the other components on the bus, i.e. deny these components access to the memory for an amount of time that would interfere with their operation, this required bandwidth should be less the entire bandwidth of the bus. Therefore a fast bus 70 should be used. A fast bus 70 is any bus whose bandwidth is equal to or greater that the required bandwidth. There are busses in current technology, including the ISA bus, whose bandwidth is significantly below the bandwidth required for this.

In the preferred embodiment of the invention the decoder/encoder 45 is coupled to the memory 50 through a fast bus 70 that has a bandwidth of at least the bandwidth required for the decoder/encoder 45 to operate in real time, a threshold bandwidth. Preferably the fast bus 70 has a bandwidth of at least approximately twice the bandwidth required for the decoder/encoder 45 to operate in real time. In the preferred embodiment the fast bus 70 is a memory bus, however any bus having the required bandwidth can be used.

The decoder/encoder 45 only requires access to the memory during operation. Therefore, when there is no need to decode or encode, the first device 42, and any other devices sharing the memory 50 have exclusive access to the memory and can use the entire bandwidth of the fast bus 70.

In the preferred embodiment, even during decoding and encoding the decoder/encoder 45 does not always use the entire required bandwidth. Since the fast bus 70 has a bandwidth a little less than twice the required bandwidth the decoder/encoder 45 uses at most 60% of the bandwidth of the fast bus 70.

The required bandwidth is determined based on the size and resolution of the image, and the type of frame (I, P, or B). In the preferred embodiment the decoder/encoder typically will be using less than 40% of the bandwidth of the fast bus 70. This frees up the remaining bandwidth to be used by the other devices the decoder/encoder 45 is sharing the memory 50 with.

The decoder/encoder 45 can decode a bitstream formatted according to any one or a combination of standards. In the preferred embodiment of the invention the decoder/encoder 45 is a multi-standard decoder/encoder capable of decoding and encoding sequences formatted to comply to several well accepted standards. This allows the decoder/encoder 45 to be able to decode a large number of video and/or audio sequences. The choice of which standards the decoder/encoder 45 is capable of decoding bitstreams formatted to and of encoding sequences to comply to is based on the desired cost, efficiency, and application of the decoder/encoder 45.

In the preferred embodiment, these standards are capable of both intrapicture compression and interpicture compression. In intrapicture compression the redundancy within the image is eliminated. In interpicture compression the redundancy between two images are eliminated and only the difference information is transferred. This requires the decoder/encoder 45 to have access to the previous or future image that contains information needed to decode or encode the current image. These precious and/or future images need to be stored then used to decode the current image. This is one of the reasons the decoder/encoder 45 requires access to the memory, and requires a large bandwidth. The MPEG-1 and MPEG-2 standards allow for decoding based on both previous images and/or future images. Therefore for a decoder/encoder 45 capable of operating in real time to be able to comply with the MPEG-1 and MPEG-2 standards it should be able to access two images, a previous and a future image, fast enough to decode the current image in the 1/30 of a second between screen refreshes.

An MPEG environment is asymmetrical; there are much fewer encoders than decoders. The encoders are very difficult and expensive to manufacture and the decoders are comparatively easy and cheap. This encourages many more decoders than encoders, with the encoders in centralized locations, and decoders available such that every end user can have a decoder. Therefore, there are many receivers but few transmitters.

For video telephony and teleconferencing each end user has to be able to both receive and transmit. H.261, and H.263 are currently well accepted standards for video telephony. An encoder that can encode sequences to comply to the H.261 and H.263 standards is less complicated, having a lower resolution and lower frame rate than an encoder that complies to the MPEG-1 or MPEG-2 standards, possibly making the quality of the decoded images somewhat lower than those from an encoder that complies with the MPEG-1 or MPEG-2 standards. Such an encoder, since it should be inexpensive and operate in real time, is also less efficient than an encoder to encode sequences to comply to the MPEG-1 or MPEG-2 standards. This means that the compression factor, which is the ratio between the source data rate and the encoded bitstream data rate, of such an encoder is lower for a given image quality than the compression factor of an MPEG encoder. However, because such an encoder is less complicated, it is much cheaper and faster than an encoder capable of complying with the MPEG-1 and/or MPEG-2 standards. This makes video telephony possible, since both a long delay in encoding the signal and a cost that is prohibitively expensive for many users is unacceptable in video telephony.

In the preferred embodiment, the decoder/encoder 45 is capable of decoding a bitstream formatted to comply to the MPEG-1, MPEG-2, H.261, and H.263 standards, and encoding a sequence to produce a bitstream to comply to the H.261, and H.263 standards. This allows the decoder/encoder 45 to be used for video telephony. Having the encoding comply to the H.261 and H.263 standards but not the MPEG-1 and MPEG-2 balances the desire to reduce the cost of transmission and storage by encoding to produce the highest compression factor and the desire to keep cost low enough to be able to mass market the device.

Figure 3:
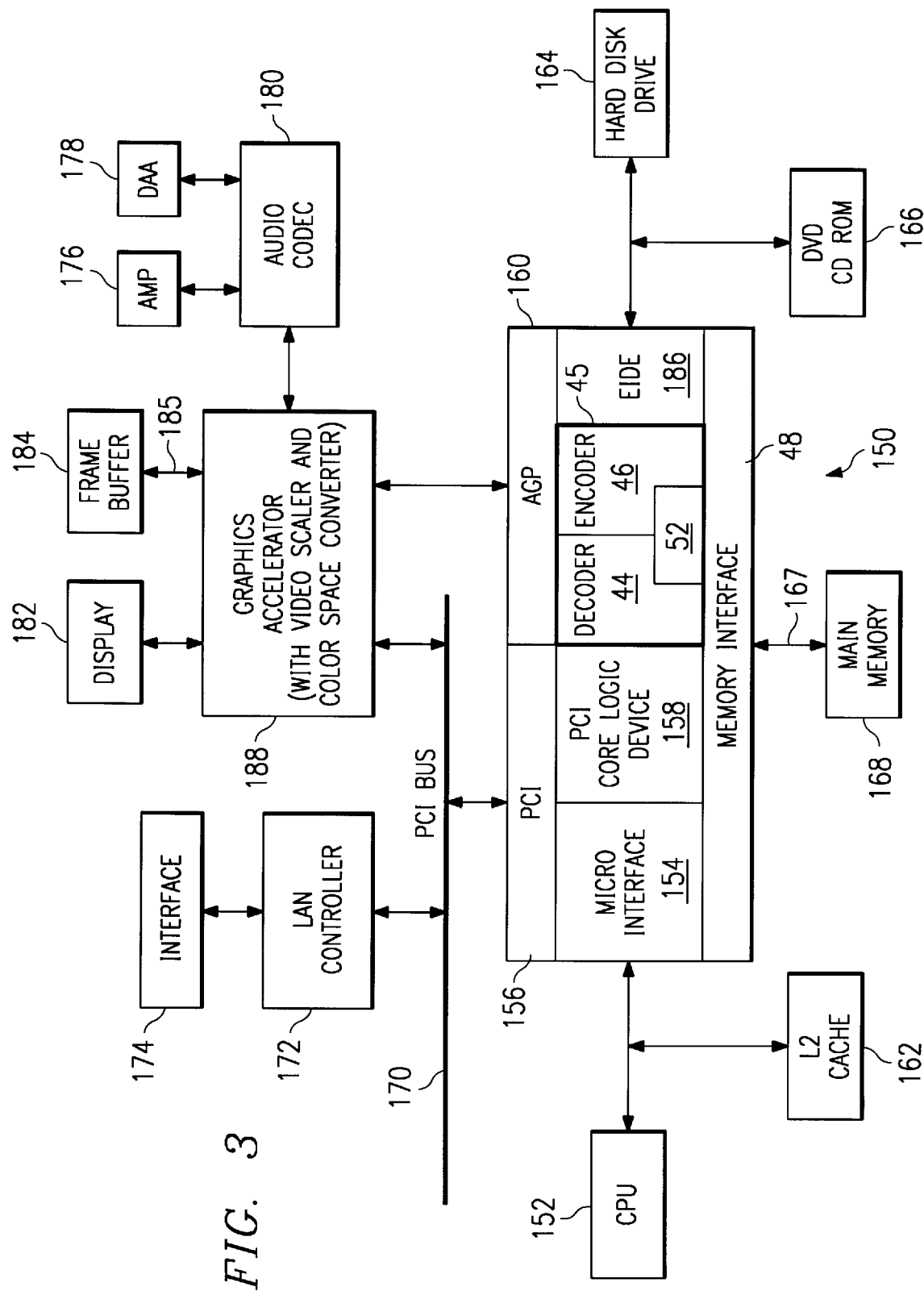
FIG. 3 is an electrical diagram, in block form, of a computer system containing a core logic chipset designed for the CPU to share a memory interface with an encoder and decoder.
Figure 4:
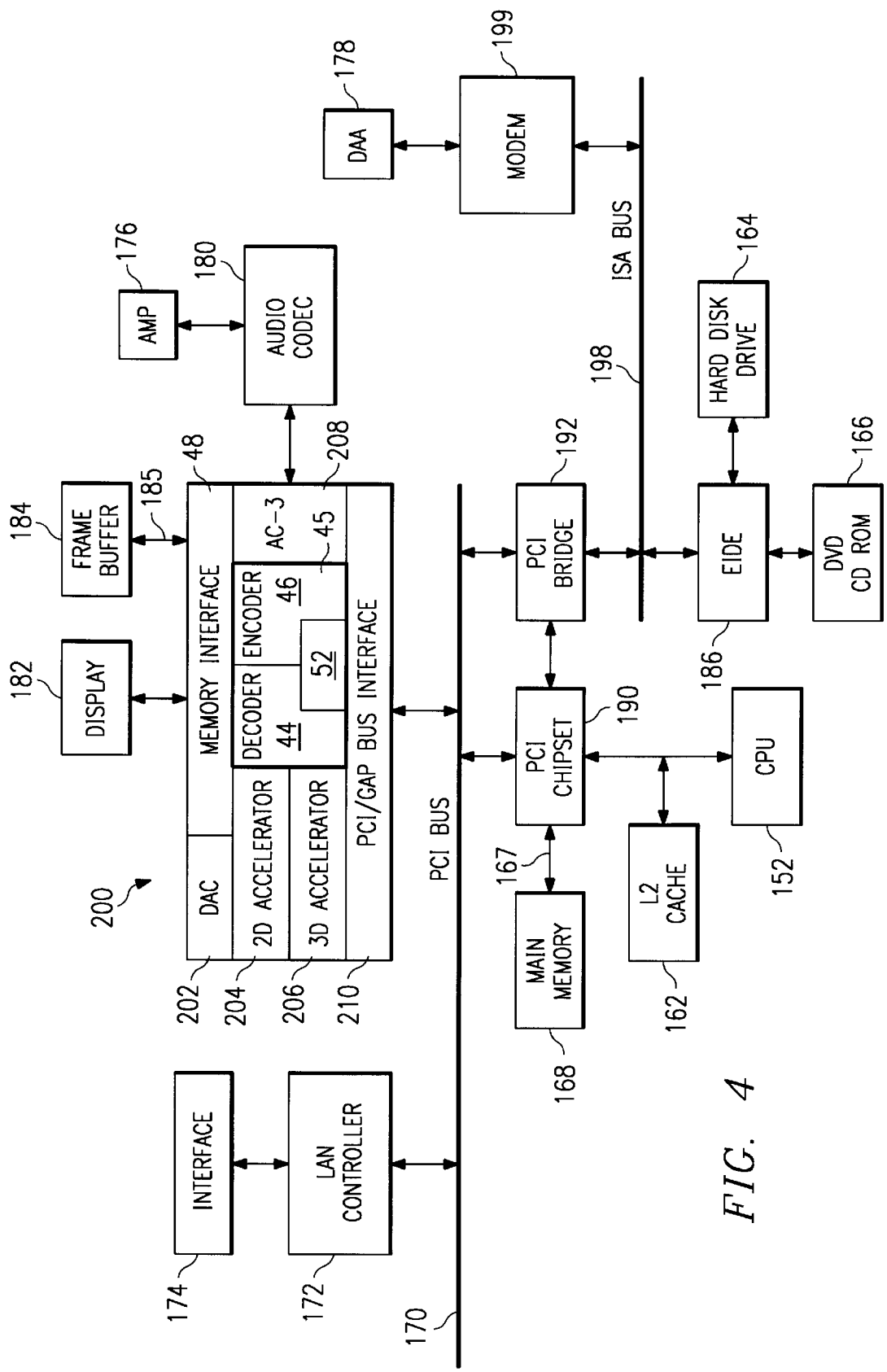
FIG. 4 is an electrical diagram, in block form, of a computer system containing a graphics accelerator designed to share a memory interface with an encoder and/or decoder.

The decoder/encoder 45 is preferably monolithically integrated into the first device as shown in FIG. 3 and FIG. 4. In FIG. 3 the decoder/encoder 45 is integrated into a core logic chipset 150. In FIG. 4 the decoder/encoder 45 is integrated into a graphics accelerator 200. Although, the decoder/encoder 45 can be separate from the first device 42, as shown in FIG. 2.

FIG. 3 shows a computer where the decoder/encoder 45 and the memory interface 48 are integrated into a core logic chipset 150. The core logic chipset 150 can be any core logic chipset known in the art. In the embodiment shown in FIG. 3 the core logic chipset 150 is a PCI core logic chipset 150, which contains a PCI core logic device 158, the processor interface 154, and bus interfaces 156 for any system busses 170 to which it is coupled. The core logic chipset 150 can also contain a accelerated graphics port (AGP) 160 if a graphics accelerator 200 is present in the computer, and an enhanced integrated device electronics (EIDE) interface 186. The core logic chipset 150 is coupled to a processor 152, peripherals, such as a hard disk drive 164 and a DVD CD-ROM 166, a bus, such as a PCI bus 170, and a main memory 168.

In this embodiment, the main memory 168 is the memory 50 to which the memory interface 48 is coupled to. The main memory 168 is coupled to the memory interface 48 through a memory bus 167. In current technology the memory bus 167, which corresponds to the fast bus 70, for coupling a core logic chipset to a memory, is capable of having a bandwidth of approximately 400 Mbytes/s. This bandwidth is at least twice the bandwidth required for an optimized decoder/encoder 45, allowing the decoder/encoder 45 to operate in real time.

The core logic chipset 150 can also be coupled to cache memory 162 and a graphics accelerator 200 if one is present in the computer. The PCI bus 170 is also coupled to the graphics accelerator 200 and to other components, such as a local-area network (LAN) controller 172. The graphics accelerator 200 is coupled to a display 182, and a frame buffer 184. The graphics accelerator can also be coupled to an audio codec 180 for decoding and/or encoding audio signals.

FIG. 4 shows a computer where the decoder/encoder 45 and the memory interface 48 are integrated into a graphics accelerator 200. The graphics accelerator 200 can be any graphics accelerator known in the art. In the embodiment shown in FIG. 4, the graphics accelerator 200 contains a 2D accelerator 204, a 3D accelerator 206, a digital to analog converter 202, and bus interfaces 210 for any system busses 170 to which it is coupled. The graphics accelerator 200 can also contain an audio compressor/decompressor 208. The graphics accelerator 200 is coupled to a display 182, and a frame buffer 184.

In this embodiment, the frame buffer 184 is the memory 50 to which the memory interface 48 is coupled. The frame buffer 184 is coupled to the memory interface 48 through a memory bus 185. In this embodiment, memory bus 185 corresponds to the fast bus 70. In current technology the memory bus 185, for coupling a graphics accelerator to a memory, is capable of having a bandwidth of up to 400 Mbytes/s. This bandwidth is more that twice the bandwidth required for an optimized decoder/encoder 45. This allows the decoder/encoder 45 to operate in real time.

The graphics accelerator 200 can also be coupled to an audio codec 180 for decoding and/or encoding audio signals. The PCI bus 170 is also coupled to a chipset 190, and to other components, such as a LAN controller 172. In the present embodiment the chipset is a PCI chipset, although it can be any conventional chipset. The chipset 190 is coupled to a processor 152, main memory 168, and a PCI bridge 192. The PCI bridge bridges between the PCI bus 170 and the ISA bus 198. The ISA bus 198 is coupled to peripherals, such as a modem 199 and to an EIDE interface 186, which is coupled to other peripherals, such as a hard disk drive 164 and a DVD CD-ROM 166. Although, if the peripherals are compatible to the PCI bus the EIDE interface 186 can be integrated in to the PCI chipset 190 and the peripherals 164, 166 can be coupled directly to the PCI chipset, eliminating the PCI bridge 192 and the ISA bus 198.

Referring to FIG. 2, the operation of the memory interface 48 during a memory request will now be described. During operation the decoder/encoder 45, the first device 42, and the refresh logic 58, if it is present, request access to the memory through the arbiter 54. There may also be other devices that request access to the memory 50 through this arbiter. The arbiter 54 determines which of the devices gets access to the memory 50. The decoder gets access to the memory in the first time interval and the first device gets access to the memory in the second time interval. The DMA engine 52 of the decoder/encoder 45 determines the priority of the decoder/encoder 45 for access to the memory 50 and of the burst length when the decoder/encoder 45 has access to the memory. The DMA engine 60 of the first device determines its priority for access to the memory 50 and the burst length when the first device 42 has access to the memory.

The decoder/encoder 45 or one of the other devices generates a request to access the memory 50. The request will be transferred to the arbiter 54. The state of the arbiter 54 is determined. The arbiter typically has three states. The first state is idle, when there is no device accessing the memory and there are no requests to access the memory. The second state is busy when there is a device accessing the memory and there are no requests to access the memory. The third state is queue when there is a device accessing the memory and there is another request to access the memory.

It is also determined if two requests are issued simultaneously. This can be performed either before or after determining the state of the arbiter. Access to the memory is determined according to the following chart.

| Arbiter state | Simultaneous requests | Action |
| --- | --- | --- |
| Idle | Yes | One of the requests gets access to the memory based on the priority scheme, and the other request is queued. |
| Busy | Yes | Both requests are queued in an order based on the priority scheme. |
| Queue | Yes | Both requests are queued in an order based on the priority scheme. |
| Idle | No | The device gets access to the memory. |
| Busy | No | The request is queued. |
| Queue | No | The requests are queued in an order based on the priority scheme. |

The priority scheme can be any priority scheme that ensures that the decoder/encoder 45 gets access to the memory 50 often enough and for enough of a burst length to operate properly, yet not starve the other devices sharing the memory. The priority of the first device, device priority, and the priority of the decoder/encoder 45, decoder priority, is determined by the priority scheme. This can be accomplished in several ways.

To operate in real time, the decoder/encoder 45 has to decode an entire image in time to be able to display it the next time the screen is refreshed, which is typically every 1/30 of a second. The decoder/encoder 45 should get access to the memory to store and retrieve parts of this and/or of past and/or future images, depending on the decoding standard being used, often enough and for long enough burst lengths to be able to decode the entire image in the 1/30 of a second between screen refreshes.

There are many ways to this. One way to do this is to make the burst length of the first device, and any other device like the screen refresh that shares the memory and memory interface, [hereinafter sharing device] have short burst lengths, and to make sure that the same device is not the next device to get access to the memory when other devices have been waiting for a long time. Another way is to preempt the sharing device if its burst length exceeds a burst length threshold and again to make sure that the same device is not the next device to get access to the memory when other devices have been waiting for a long time. Preferably, when the preemption is used the sharing device would be preempted when its burst length exceeds 16 words. A third way is to limit the bandwidth available to the sharing devices, this way the decoder/encoder 45 always has enough bandwidth to operate in real time. Preferably the bandwidth of the sharing devices is limited only when the decoder/encoder 45 is operating. In the preferred embodiment a memory queue, such as a FIFO, in the decoder/encoder 45 generates an error signal when it falls below a data threshold. The error is sent to the CPU 152 and the CPU 152 can either shut down the system, drop an image frame or resume the decoding/encoding process.

There are also many ways to make sure that the same device is not the next device to get access to the memory when other devices have been waiting for a long time. This both ensures decoder/encoder 45 gets access to the memory 50 often enough, yet not starve the other devices sharing the memory. One way to do this is to disallow back to back requests. Another is to have shifting priority, where a particular request starts with a lower priority when first made and the priority increases with the length of time the request is in the queue, eventually reaching a priority above all of the other requests. In the preferred embodiment, the decoder/encoder 45 has a one clock cycle delay between requests to allow a sharing device to generate a request between the decoder/encoder requests.

In the preferred embodiment the burst length of the decoder is relatively short, approximately four to seventeen words. This allows the graphics accelerator more frequent access to the memory to ensure that the display is not disturbed by the sharing of the memory interface 48 and memory 50 when the decoder/encoder is in the graphics accelerator 200.

An electronic system 40, shown in FIG. 2, containing the first device 42, the memory interface 48 coupled to a memory 50 and to the first device 42, a decoder/encoder 45 coupled to the memory interface 48, where the decoder/encoder 45 shares the memory interface 48 with the first device 42 provides several advantages. Referring to FIG. 2 and FIG. 1b simultaneously, the decoder 44, and encoder 46, according to the preferred embodiment of the invention do not need their own memory interfaces 18, as was needed in the prior art. Eliminating the memory interface 18 results in reducing the die size. This allows both a reduction in the price per die of the decoder, or encoder, and an increase in the volume of the product that can be produced.

Additionally, because the decoder/encoder 45 shares the memory interface 48 of the first device it also shares its memory 50. This eliminates the dedicated memory 22 that was necessary in the prior art for the decoder/encoder to operate in real time, resulting in significant reduction in the cost of the device. Allowing the decoder/encoder 45 to share the memory 50 with a first device 42 and to allow the decoder/encoder 45 to access the memory 50 through a fast bus 70 having a bandwidth of a least the bandwidth threshold permits the decoder/encoder to operate in real time. This allows the decoder/encoder to operate in real time and reduces stops between images and dropping frames to a point where both are practically eliminated. This produces better images, and eliminates any discontinuities and delays present in the prior art.

Furthermore, as the geometry used for devices decreases and the functionality of device increases the number of pads required in them increases. This at times requires the die size to be dictated by the number of pads and their configuration, leaving empty space on the die. This is typically the situation for core logic chipsets. In current technology, the pad requirements of a core logic chipset require the chipset to be one-third larger than required for the functional components of the core logic chipset. That means that one-third of the die space is empty. Incorporating the decoder/encoder 45 into the core logic chipset 150, as shown in FIG. 3 provides the added advantage of effectively utilizing that space, without adding any extra pins to the core logic chipset 150. It also provides better connections between the decoder/encoder 45 and the core logic chipset 150.

Further background on compression can be found in: International Organization for Standards, INFORMATION TECHNOLOGY—CODING OF MOVING PICTURES AND ASSOCIATED AUDIO FOR DIGITAL STORAGE MEDIA AT UP TO ABOUT 1.5 MBITS/S, Parts 1–6, International Organization for Standards; International Standards Organization, INFORMATION TECHNOLOGY—GENERIC CODING OF MOVING PICTURES AND ASSOCIATED AUDIO INFORMATION, Parts 1–4, International Organization for Standards; Datasheet "STi3500A" Datasheet of SGS-THOMSON Microelectronics; STi3500A—"Advanced Information for an MPEG Audio/MPEG-2 Video Integrated Decoder" (June 1995); Watkinson, John, COMPRESSION IN VIDEO AND AUDIO, Focal Press, 1995; Minoli, Daniel, VIDEO DIALTONE TECHNOLOGY, McGraw-Hill, Inc., 1995. Further background on computer architecture can be found in Anderson, Don and Tom Shanley, ISA SYSTEM ARCHITECTURE, 3rd ed., John Swindle ed., MindShare Inc., Addison-Wesley Publishing Co., 1995. All of the above references incorporated herein by reference.

While the invention has been specifically described with reference to several preferred embodiments, it will be understood by those of ordinary skill in the prior art having reference to the current specification and drawings that various modifications may be made and various alternatives are possible therein without departing from the spirit and scope of the invention.

For example:

Although the memory is described as DRAM the other types of memories including read-only memories, SRAMs, or FIFOs may be used without departing from the scope of the invention.

Any conventional decoder including a decoder complying to the MPEG-1, MPEG-2, H.261, or H.261 standards, or any combination of them, or any other conventional standard can be used as the decoder/encoder.

We claim:

1. An electronic system coupled to a memory, comprising:
   a first device that requires access to the memory;
   a decoder that requires access to the memory sufficient to maintain real time operation; and
   a memory interface for coupling to the memory, and coupled to the first device and to the decoder, the memory interface having an arbiter for selectively providing access for the first device and the decoder to the memory and a shared bus coupled to the memory the first device, and the decoder, the bus having a sufficient bandwidth to enable the decoder to access the memory and operate in real time when the first device simultaneously accesses the bus.

2. The electronic system of claim 1, wherein:
   the first device is capable of having a variable bandwidth; and
   the decoder is capable of having a variable bandwidth.

3. The electronic system of claim 1, wherein the decoder comprises a video decoder.

4. The electronic system of claim 1, wherein the decoder is capable of decoding a bitstream formatted to comply with the MPEG-2 standard.

5. The electronic system of claim 1, further comprising an encoder coupled to the memory interface.

6. The electronic system of claim 5, wherein the decoder, the encoder and the memory interface are monolithically integrated into the first device.

7. The electronic system of claim 5, wherein the encoder is capable of producing a bitstream that complies with the H.263 standard.

8. The electronic system of claim 1, wherein the decoder and the memory interface are monolithically integrated into the first device.

9. The electronic system of claim 2, wherein the first device is a processor chipset.

10. The electronic system of claim 1, wherein the processor chipset is coupled to a processor.

11. The electronic system of claim 1, wherein the first device is a graphics accelerator.

12. The electronic system of claim 1, wherein the decoder is capable of decoding a bitstream formatted to comply with the MPEG-2 standard.

13. The electronic system of claim 1, wherein the bus has a bandwidth of at least twice the bandwidth required for the decoder to operate in real time.

14. The electronic system of claim 1, wherein the fast bus comprises a memory bus.

15. A computer comprising:
processing means;
an input device connected to the processing means;
an output device connected to the processing means;
a memory connected to the processing means;
a first device that requires access to the memory;
a decoder that requires access to the memory sufficient to maintain real time operation; and
a memory interface coupled to the memory, to the first device, and to the decoder, the memory interface having a means for selectively providing access for the first device and the decoder to the memory and a shared bus coupled to the decoder, the first device, and the memory, the shared bus having a sufficient bandwidth to enable the decoder to operate in real time while sharing access to the bus.

16. The computer of claim 15, wherein:
the first device is capable of having a variable bandwidth; and
the decoder is capable of having a variable bandwidth.

17. The computer of claim 15, wherein the decoder comprises a video decoder.

18. The computer of claim 15, wherein the decoder is capable of decoding a bitstream formatted to comply with the MPEG-2 standard.

19. The computer of claim 15, wherein the memory interface further comprises an arbiter for selectively providing access for the first device and the decoder to the memory.

20. The computer of claim 15, further comprising an encoder coupled to the memory interface.

21. The computer of claim 20, wherein the decoder, the encoder and the memory interface are monolithically integrated into the first device.

22. The computer of claim 20, wherein the encoder is capable of producing a bitstream that complies with the H.263 standard.

23. The computer of claim 15, wherein the decoder and the memory interface are monolithically integrated into the first device.

24. The computer of claim 15, wherein the first device is a processor chipset.

25. The computer of claim 24, wherein the processor chipset is coupled to a processor.

26. The computer of claim 15, wherein the first device is a graphics accelerator.

27. The computer of claim 15, wherein the decoder is capable of decoding a bitstream formatted to comply with the MPEG-2 standard.

28. The computer of claim 15, wherein the shared bus has at least twice the required bandwidth for the decoder to operate in real time.

29. In an electronic system having a first device coupled to a memory interface and a memory coupled to the memory interface, the first device having a device priority and capable of generating a request to access the memory, a method for selectively providing access to the memory comprising the steps of:
providing a decoder coupled to the memory interface through a bus having sufficient bandwidth to enable the decoder to operate in real time while sharing access to the bus, having a decoder priority and capable of generating a request to access the memory;
providing an arbiter having an idle, a busy and a queue state;
generating a request by the decoder to access the memory;
determining the state of the arbiter;
providing the decoder access to the memory responsive to the arbiter being in the idle state for the decoder to operate in real time;
queuing the request responsive to the arbiter being in the busy state; and
queuing the request responsive to the arbiter being in the queue state in an order responsive to the priority of the decoder request and the priority of any other queued requests.

30. The method of claim 29, further comprising the steps of:
determining the number of requests issued simultaneously;
responsive to number of requests issued simultaneously being greater than one:
selectively providing access to the memory responsive to the arbiter being in the idle state, and the priority of the simultaneously issued requests;
queuing the simultaneously issued requests responsive to the arbiter being in the busy state in an order responsive to the priority of the simultaneously issued requests;
queuing the simultaneously issued requests responsive to the arbiter being in the queue state in an order responsive to the priority of the simultaneously issued requests and the priority of any other queued requests.

31. The method of claim 30, wherein the step of determining the number of requests issued simultaneously is performed prior to the step of determining the state of the arbiter.

32. The method of claim 29, further comprising the step of preempting the first device access to the memory and providing the decoder access to the memory responsive to the first device having a burst length above a burst length threshold.

33. The method of claim 29, wherein the decoder priority increases responsive to the length of time the request issued by the decoder is queued.

* * * * *